United States Patent
Mouri et al.

(10) Patent No.: US 10,471,886 B1
(45) Date of Patent: Nov. 12, 2019

(54) VEHICLE FRONT HEADLIGHT DEVICE

(71) Applicants: Fumihiko Mouri, Owariasahi (JP); Takahiko Honda, Shizuoka (JP)

(72) Inventors: Fumihiko Mouri, Owariasahi (JP); Takahiko Honda, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 0 days.

(21) Appl. No.: 16/372,866

(22) Filed: Apr. 2, 2019

(30) Foreign Application Priority Data

May 18, 2018 (JP) .................................. 2018-096045

(51) Int. Cl.
| | |
|---|---|
| B60Q 1/14 | (2006.01) |
| F21S 41/30 | (2018.01) |
| F21S 41/00 | (2018.01) |
| G02B 7/182 | (2006.01) |

(52) U.S. Cl.
CPC ............... B60Q 1/14 (2013.01); F21S 41/00 (2018.01); F21S 41/30 (2018.01); B60Q 2300/41 (2013.01); B60Q 2300/45 (2013.01); G02B 7/1821 (2013.01)

(58) Field of Classification Search
CPC ................................ G02B 7/1821; F21S 41/00
USPC ............................. 315/77, 82; 362/459, 487
See application file for complete search history.

(56) References Cited

U.S. PATENT DOCUMENTS

| | | | |
|---|---|---|---|
| 2006/0164851 A1* | 7/2006 | Collot | F21S 41/255 |
| | | | 362/509 |
| 2013/0038736 A1 | 2/2013 | Yamamura | |
| 2017/0159903 A1 | 6/2017 | Yamamura | |
| 2017/0159904 A1 | 6/2017 | Yamamura | |
| 2017/0160542 A1* | 6/2017 | Mouri | F21S 41/147 |
| 2017/0185855 A1 | 6/2017 | Yamamura | |
| 2018/0209603 A1* | 7/2018 | Kratochvil | F21S 41/675 |

FOREIGN PATENT DOCUMENTS

JP 5722882 5/2015

\* cited by examiner

*Primary Examiner* — Thuy V Tran
(74) *Attorney, Agent, or Firm* — Oblon, McClelland, Maier & Neustadt, L.L.P.

(57) ABSTRACT

A vehicle front headlight device includes a light source, a rotating mirror that is configured by disposing a first mirror body and a second mirror body around a circumferential direction of a shaft, that is rotationally driven about the shaft and rotates while reflecting light emitted by the light source, a lens that transmits light reflected by the rotating mirror so as to illuminate the light forward, and a controller for controlling rotational drive of the rotating mirror. A first illuminated region of light that is reflected by the first mirror body and that is radiated forward through the lens, and a second illuminated region of light that is reflected by the second mirror body and that is radiated forward through the lens, are offset from each other in a vehicle width direction or in a vehicle vertical direction.

12 Claims, 12 Drawing Sheets

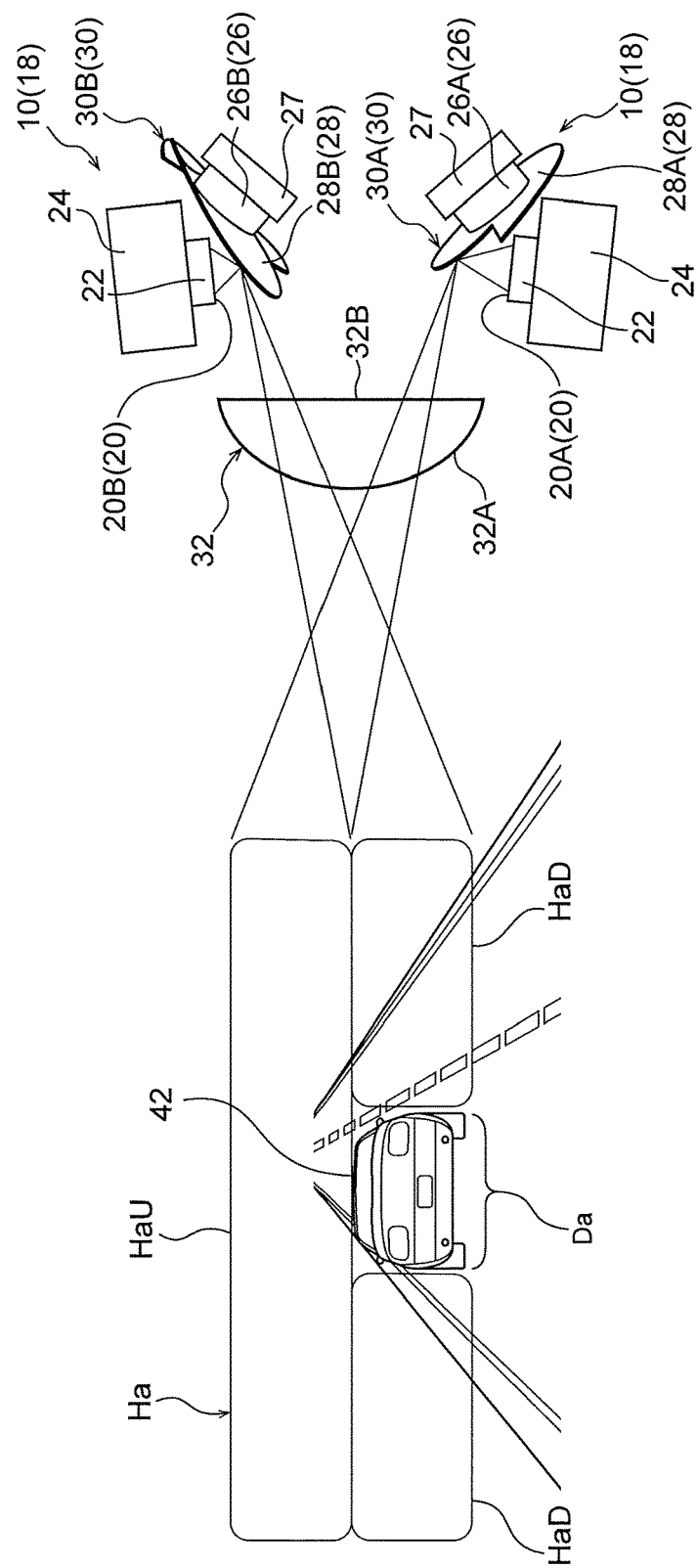

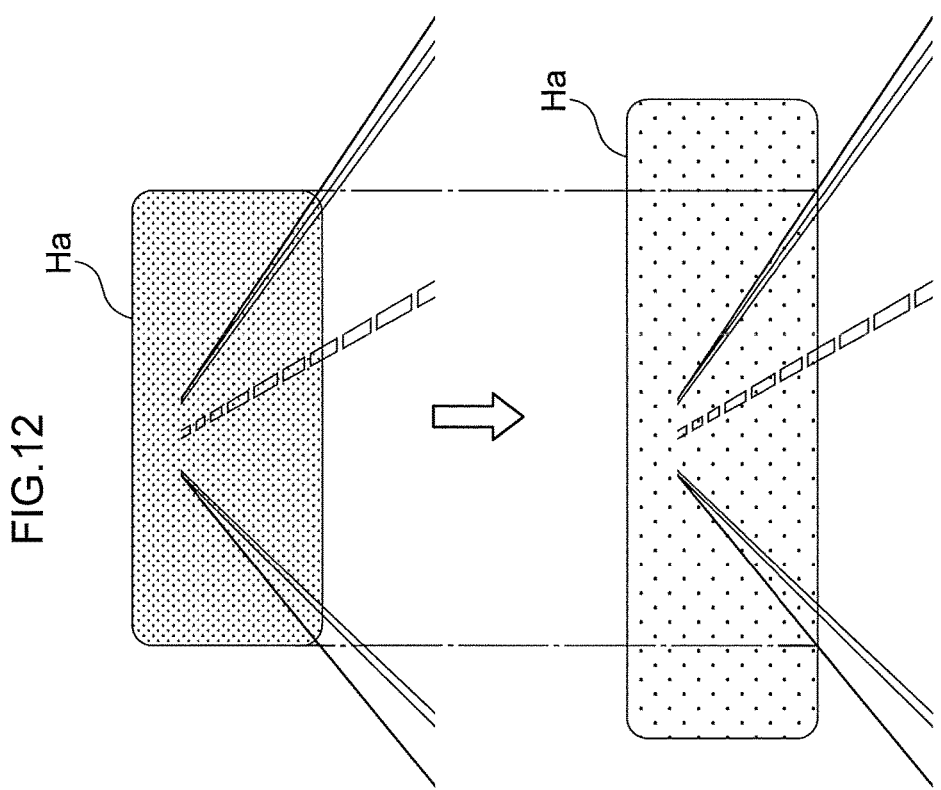

VEHICLE FRONT HEADLIGHT DEVICE

CROSS-REFERENCE TO RELATED APPLICATION

This application claims priority under 35 USC 119 from Japanese Patent Application No. 2018-096045 filed May 18, 2018, the disclosure of which is incorporated by reference herein in its entirety.

BACKGROUND

Technical Field

The present disclosure relates to a vehicle front headlight device.

Related Art

Optical units (vehicle front headlight devices) have been proposed in which a rotating mirror is capable of changing a high beam light distribution area (illuminated region) in a vehicle width direction (see Japanese Patent No. 5722882).

In such optical units, however, enlarging the high beam light distribution area in the vehicle width direction or a vehicle vertical direction while maintaining the same number of light sources (LEDs or the like) results in an overall decrease in light illumination intensity.

Accordingly, the present disclosure obtains a vehicle front headlight device capable of suppressing a decrease in light illumination intensity, even when an illuminated region is enlarged.

SUMMARY

A vehicle front headlight device of a first aspect of the present disclosure includes a light source, a rotating mirror, a lens, and a controller. The light source is configured to emit light. The rotating mirror is configured by disposing a first mirror body and a second mirror body around a circumferential direction of a shaft, is rotationally driven about the shaft, and rotates while reflecting light emitted by the light source. The lens transmits light reflected by the rotating mirror so as to illuminate the light forward. The controller controls rotational drive of the rotating mirror. Moreover, a first illuminated region of light that is reflected by the first mirror body and that is radiated forward through the lens, and a second illuminated region of light that is reflected by the second mirror body and that is radiated forward through the lens are offset from each other in a vehicle width direction or in a vehicle vertical direction.

According to the vehicle front headlight device of the first aspect, the first illuminated region of light and the second illuminated region of light are offset from each other in the vehicle width direction or in the vehicle vertical direction. Namely, the mutually independent first illuminated region and second illuminated region enlarge an overall illuminated region in either the vehicle width direction or the vehicle vertical direction. Accordingly, a decrease in the light illumination intensity is suppressed, even when the illuminated region is enlarged in the vehicle width direction or the vehicle vertical direction.

A vehicle front headlight device of a second aspect of the present disclosure includes a first light source and a second light source, a first rotating mirror, a second rotating mirror, a lens, and a controller. The first light source and the second light source are configured to emit light. The first rotating mirror is rotationally driven about a first shaft, and rotates while reflecting light emitted by the first light source. The second rotating mirror is rotationally driven about a second shaft, and rotates while reflecting light emitted by the second light source. The lens transmits the light reflected by the first rotating mirror and the second rotating mirror and illuminates the light forward. The controller controls rotational drive of the first rotating mirror and the second rotating mirror. Moreover, a first illuminated region of light that is reflected by the first rotating mirror and that is radiated forward through the lens, and a second illuminated region of light that is reflected by the second rotating mirror and that is radiated forward through the lens are offset from each other in a vehicle width direction or in a vehicle vertical direction.

According to the vehicle front headlight device of the second aspect, the first illuminated region of light and the second illuminated region of light are offset from each other in the vehicle width direction or in the vehicle vertical direction. Namely, the mutually independent first illuminated region and second illuminated region enlarge an overall illuminated region in either the vehicle width direction or the vehicle vertical direction. Accordingly, a decrease in the light illumination intensity is suppressed, even when the illuminated region is enlarged in the vehicle width direction or the vehicle vertical direction.

A vehicle front headlight device of a third aspect of the present disclosure is the vehicle front headlight device of the first aspect or the second aspect, wherein the first illuminated region and the second illuminated region partially overlap with each other.

According to the vehicle front headlight device of the third aspect, the first illuminated region and the second illuminated region partially overlap with each other. The illumination intensity in the overlapping portion is thereby raised.

A vehicle front headlight device of a fourth aspect of the present disclosure is the vehicle front headlight device of the third aspect, wherein the first illuminated region and the second illuminated region are offset from each other in the vehicle width direction, and a portion where the first illuminated region and the second illuminated region overlap is a substantially central portion in the vehicle width direction.

According to the vehicle front headlight device of the fourth aspect, the portion where the first illuminated region and the second illuminated region, that are offset with respect to each other in the vehicle width direction, overlap is a substantially central portion in the vehicle width direction. Namely, the illumination intensity at the substantially central portion in the vehicle width direction ahead of the vehicle is raised. This improves the ability of the driver of the vehicle to see ahead of the vehicle when traveling at night and so on.

A vehicle front headlight device of a fifth aspect of the present disclosure is the vehicle front headlight device of the first aspect, further includes a recognition unit configured to recognize a leading vehicle traveling ahead. Moreover, the first illuminated region and the second illuminated region are configured in this sequence from a vehicle upper side, and the controller controls a timing to switch off and a timing to switch on light that is emitted toward the second mirror body such that light is not radiated onto the leading vehicle recognized by the recognition unit.

According to the vehicle front headlight device of the fifth aspect, the controller controls the timing to switch off and the timing to switch on light that is emitted toward the second mirror body, such that light is not radiated onto a leading vehicle recognized by the recognition unit. A driver and so on of the leading vehicle is thereby suppressed from being dazzled.

A vehicle front headlight device of a sixth aspect of the present disclosure is the vehicle front headlight device of the second aspect, further includes a recognition unit configured to recognize a leading vehicle traveling ahead. Moreover, the first illuminated region and the second illuminated region are configured in this sequence from a vehicle upper side, and the controller controls a timing to switch off and a timing to switch on light that is emitted toward the second mirror body such that light is not radiated onto the leading vehicle recognized by the recognition unit.

According to the vehicle front headlight device of the sixth aspect, the controller controls the timing to switch off and the timing to switch on light that is emitted toward the second rotating mirror, such that light is not radiated onto a leading vehicle recognized by the recognition unit. A driver and so on of the leading vehicle is thereby suppressed from being dazzled.

A vehicle front headlight device of a seventh aspect of the present disclosure includes a light source, a rotating mirror, a lens, and a controller. The light source is configured to emit light. The rotating mirror is configured by disposing a first mirror body, a second mirror body, and a third mirror body around a circumferential direction of a shaft, is rotationally driven about the shaft, and rotates while reflecting light emitted by the light source. The lens transmits light reflected by the rotating mirror and illuminates the light forward. The controller controls rotational drive of the rotating mirror. A first illuminated region of light that is reflected by the first mirror body and that is radiated forward through the lens, a second illuminated region of light that is reflected by the second mirror body and that is radiated forward through the lens, and a third illuminated region of light that is reflected by the third mirror body and that is radiated forward through the lens are offset from each other in a vehicle vertical direction.

According to the vehicle front headlight device of the seventh aspect, the first illuminated region of light, the second illuminated region of light, and the third illuminated region of light are offset from each other in the vehicle vertical direction. Namely, the mutually independent first illuminated region, second illuminated region, and third illuminated region enlarge an overall illuminated region in the vehicle vertical direction. Accordingly, a decrease in the light illumination intensity is suppressed, even when the illuminated region is enlarged in the vehicle vertical direction.

A vehicle front headlight device of an eighth aspect of the present disclosure is the vehicle front headlight device of the seventh aspect, further includes a recognition unit configured to recognize a leading vehicle traveling ahead. Moreover, the first illuminated region, the second illuminated region, and the third illuminated region are configured in this sequence from a vehicle upper side, and the controller controls a timing to switch off and a timing to switch on light that is emitted toward at least the third mirror body such that light is not radiated onto the leading vehicle recognized by the recognition unit.

According to the vehicle front headlight device of the eighth aspect, the controller controls the timing to switch off and the timing to switch on light that is emitted toward at least the third mirror body, such that light is not radiated onto a leading vehicle recognized by the recognition unit. A driver and so on of the leading vehicle is thereby suppressed from being dazzled.

A vehicle front headlight device of a ninth aspect of the present disclosure is the vehicle front headlight device of the seventh aspect or the eighth aspect, further including a pedestrian recognition unit configured to recognize that a pedestrian is present at a roadside. Moreover, the first illuminated region, the second illuminated region, and the third illuminated region are configured in this sequence from a vehicle upper side, and the controller controls a timing to switch off and a timing to switch on light that is emitted toward the first mirror body or the second mirror body such that light is not radiated onto at least a face of the pedestrian recognized by the pedestrian recognition unit.

According to the vehicle front headlight device of the ninth aspect, the controller controls the timing to switch off and the timing to switch on light that is emitted toward either the first mirror body or the second mirror body, such that light is not radiated onto at least the face of the pedestrian recognized by the pedestrian recognition unit. A pedestrian present at the roadside is thereby suppressed from being dazzled.

The first aspect, the second aspect, and the seventh aspect of the present disclosure enable a decrease in the light illumination intensity to be suppressed, even when the illuminated region is enlarged.

The third aspect of the present disclosure enables illumination intensity to be raised in the portion where the first illuminated region and the second illuminated region overlap with each other.

The fourth aspect of the present disclosure enables the ability of the driver of the vehicle to see ahead of the vehicle to be improved.

The fifth aspect, the sixth aspect, and the eighth aspect of the present disclosure enable the driver and so on of a leading vehicle to be suppressed from being dazzled.

The ninth aspect of the present disclosure enables a pedestrian present at the roadside to be suppressed from being dazzled.

BRIEF DESCRIPTION OF THE DRAWINGS

Exemplary embodiments will be described in detail based on the following figures, wherein:

FIG. 11 is an explanatory diagram illustrating a high beam light distribution area formed by a vehicle front headlight device according to a fourth exemplary embodiment; and FIG. 12 is an explanatory diagram illustrating a high beam light distribution area of a vehicle front headlight device according to a comparative example.

DETAILED DESCRIPTION

Figure 1:
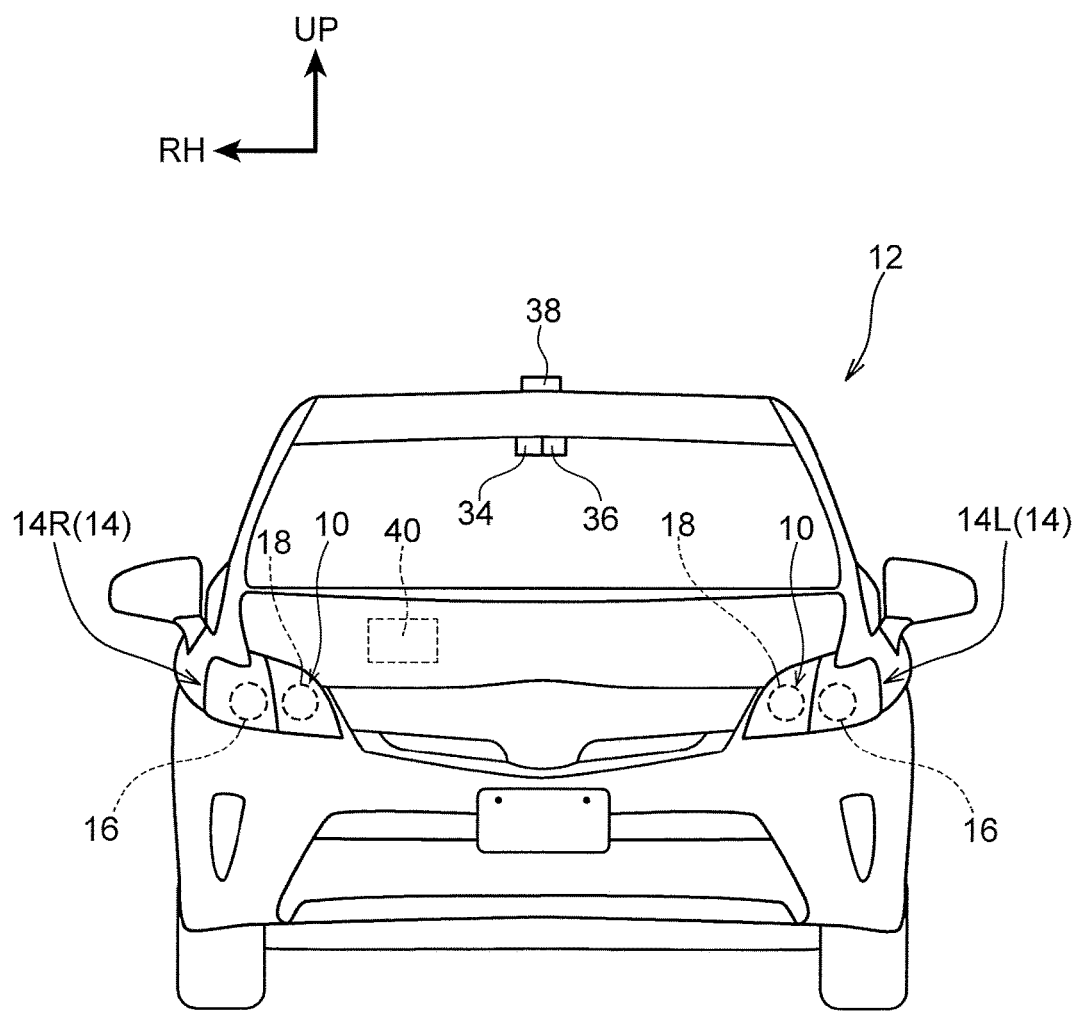
FIG. 1 is a front view illustrating a vehicle provided with a vehicle front headlight device according to an exemplary embodiment.

Detailed explanation follows regarding exemplary embodiments of the present disclosure, with reference to the drawings.

To assist explanation, in the drawings the arrow UP indicates a vehicle upper side, the arrow FR indicates a vehicle front side, and the arrow RH indicates a vehicle right side, as appropriate. In the following explanation, unless indicated otherwise, reference to up, down, front, rear, left, and right directions refers to up and down in a vehicle vertical direction, front and rear in a vehicle front-rear direction, and left and right in a vehicle left-right direction (vehicle width direction).

As illustrated in FIG. 1, a vehicle 12 is provided with a pair of left and right headlamp units 14 to secure the field of view ahead of the vehicle 12. Namely, a headlamp unit 14R is disposed on the right of a front end section of the vehicle 12, and a headlamp unit 14L is disposed on the left of the front end section of the vehicle 12.

The headlamp units 14R, 14L are configured with left-right symmetry to each other in the vehicle width direction, and are each configured including a low beam unit 16 disposed at a vehicle width direction outer side, and a high beam unit 18 disposed at a vehicle width direction inner side. The low beam units 16 each shine visible light through a lens (not illustrated in the drawings) onto a low beam light distribution area (not illustrated in the drawings) on the road (road surface) ahead of the vehicle 12.

The high beam units 18 each illuminates visible light through a lens 32 (see FIG. 2), described later, onto a high beam light distribution area Ha (see FIG. 2, FIG. 3, etc.) at the front side and upper side of the low beam light distribution area illuminated by the low beam units 16. Note that a vehicle front headlight device 10 according to respective exemplary embodiments is applied to the high beam units 18.

First Exemplary Embodiment

Figure 2:
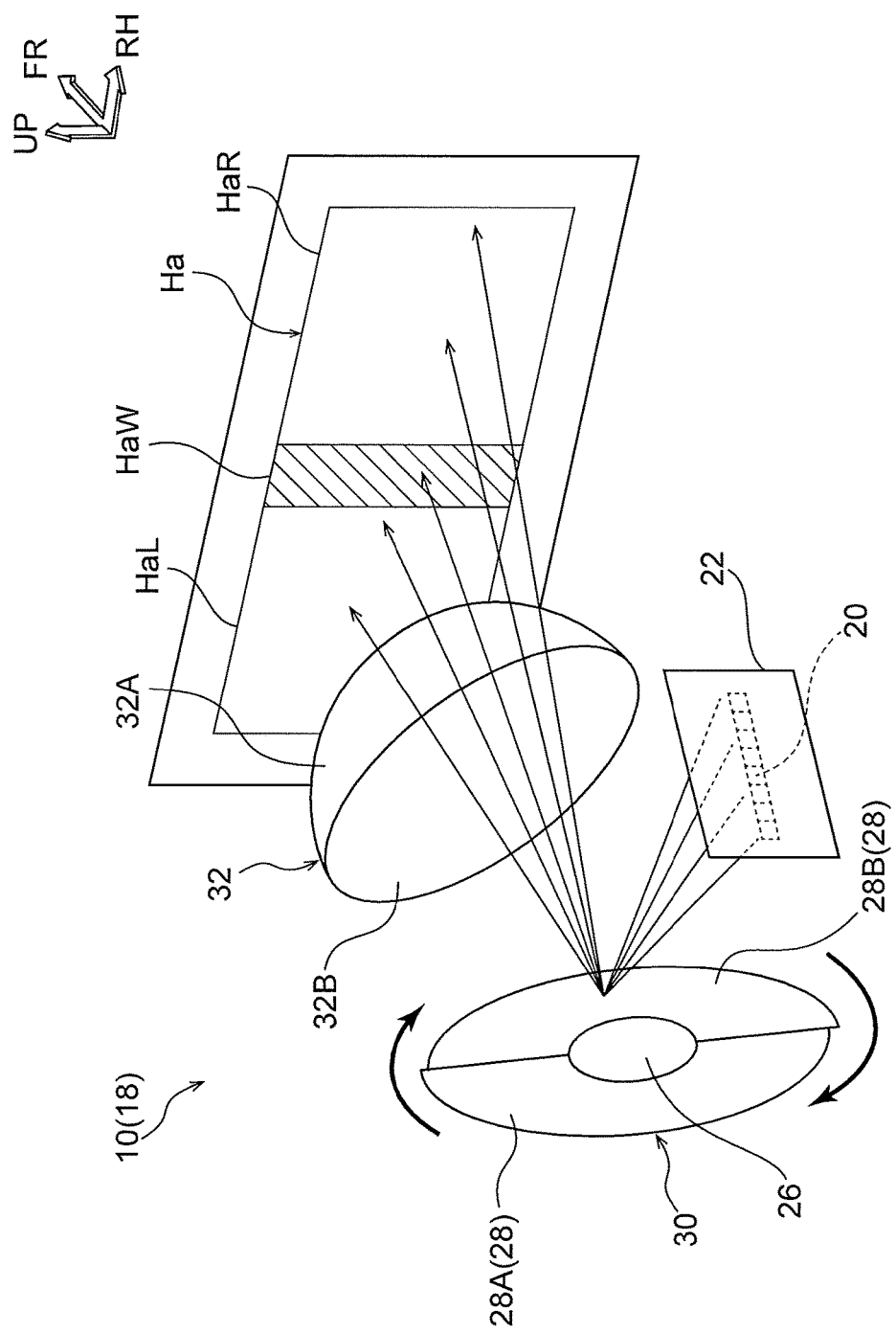
FIG. 2 is a schematic perspective view illustrating a vehicle front headlight device according to a first exemplary embodiment.
Figure 3:
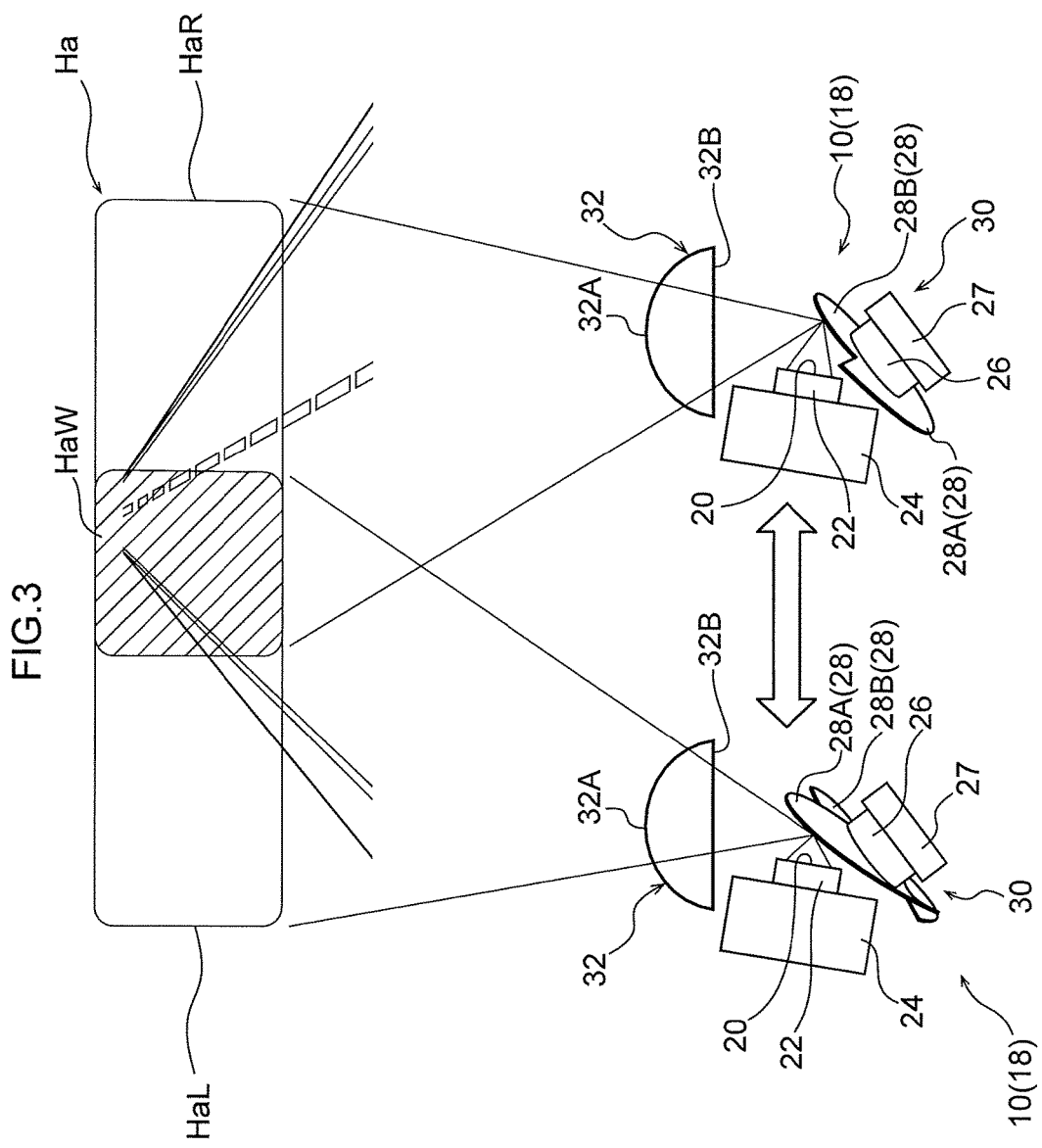
FIG. 3 is an explanatory diagram illustrating a high beam light distribution area formed by the vehicle front headlight device according to the first exemplary embodiment.

As illustrated in FIG. 2 and FIG. 3, the high beam units 18 applied with the vehicle front headlight device 10 according to a first exemplary embodiment each include a light source 20 that emits visible light, a rotating mirror 30 that reflects the visible light emitted from the light source 20, and a single lens 32 that transmits the visible light reflected by the rotating mirror 30 and illuminates (projects) the visible light ahead (to the exterior of) the vehicle 12.

The light source 20 is configured by plural (for example, eight) light emitting diodes (LEDs) arranged on a substrate 22 so as to form a single row with no gaps present between the LEDs. The substrate 22 is disposed on a heat sink 24 (see FIG. 3). The light source 20 (the respective LEDs) is electrically connected to a controller 40 (see FIG. 1), and the light source 20 is switched on and off not only by switch operation by a driver, but also under the control of the controller 40.

A front surface of the lens 32 is configured by a projecting semispherical curved surface 32A. A rear surface of the lens 32 is configured by a flat surface 32B. Visible light that has been reflected by the rotating mirror 30 and incident to the rear surface (flat surface 32B) of the lens 32 passes through the lens 32 and is radiated ahead of the vehicle from the front surface (curved surface 32A) of the lens 32. In the interests of simplicity, diffraction of the light by the lens 32 is not illustrated in the respective drawings. The rear surface of the lens 32 is not limited to the flat surface 32B.

The rotating mirror 30 is configured by plural mirror bodies 28 each inclined at a predetermined angle with respect to an axial direction of a shaft 26. The mirror bodies 28 are disposed at uniform intervals around a peripheral direction of the shaft 26. The rotating mirror 30 according to the first exemplary embodiment is provided with two of the mirror bodies 28, each of the mirror bodies 28 having a substantially semicircular profile as viewed along the axial direction. Namely, the rotating mirror 30 is configured including a first mirror body 28A with a curvature that reflects light toward the left, and a second mirror body 28B with a curvature that reflects light toward the right.

The rotating mirror 30 is capable of being rotationally driven in one direction about the shaft 26. Namely, the rotating mirror 30 has a fan-like structure in which the shaft 26 is rotationally driven in the one direction by a motor 27 (see FIG. 3). The motor 27 is electrically connected to the controller 40, and the rotating mirror 30 is rotationally driven under the control of the controller 40.

Explanation follows regarding the high beam light distribution area Ha formed by light reflected by the rotating mirror 30. In the following explanation, the left side of a substantially central portion in the vehicle width direction ahead of the vehicle 12 is referred to as the "forward-left", and the right side of the substantially central portion in the vehicle width direction ahead of the vehicle 12 is referred to as the "forward-right".

As illustrated in FIG. 3, the high beam light distribution area Ha is formed by a first illuminated region HaL of light radiated toward the forward-left of the vehicle 12, and a second illuminated region HaR of light radiated toward the forward-right of the vehicle 12. The first illuminated region HaL and the second illuminated region HaR partially overlap with each other (at the substantially central portion in the vehicle width direction). Note that FIG. 3 illustrates two of the high beam units 18. However, each of the high beam units 18 corresponds to a single high beam unit 18 of the headlamp unit 14L on the left of the front end section of the vehicle 12 in FIG. 1. Namely, in order to help explain the first illuminated region HaL and the second illuminated region HaR that are radiated by the single high beam unit 18, the high beam unit 18 of the headlamp unit 14L on the left of the front end section of the vehicle 12 is illustrated conceptually.

The first illuminated region HaL is formed by light reflected by the first mirror body 28A and radiated toward the forward-left through the lens 32, and the second illuminated region HaR is formed by light reflected by the second mirror body 28B and radiated toward the forward-right through the lens 32. First, explanation is given regarding the first illuminated region HaL formed by light reflected by the first mirror body 28A.

Figure 4:
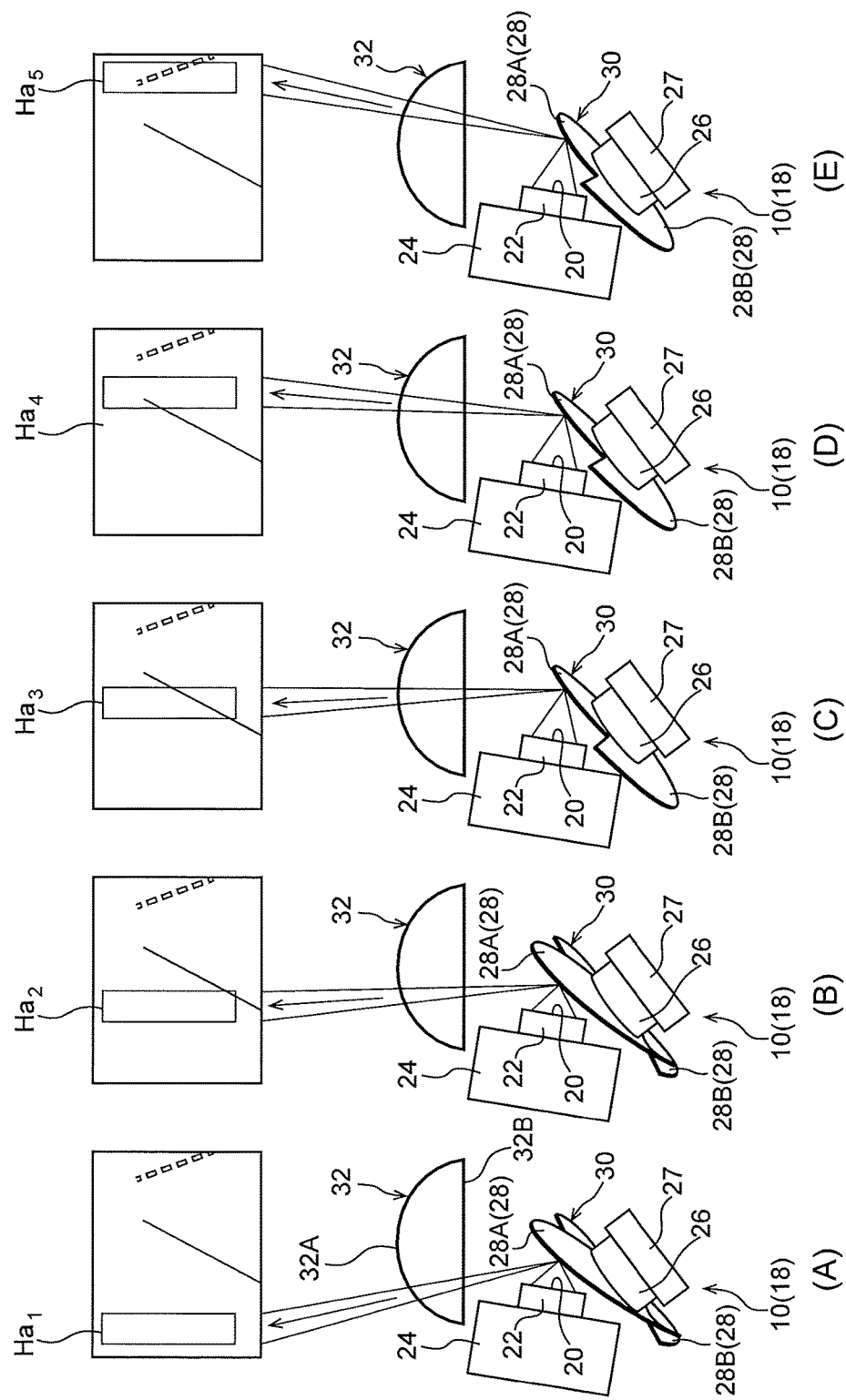
FIG. 4 is an explanatory diagram illustrating a sequence of illuminated regions at predetermined different points in time when a first mirror body undergoes half a revolution in the vehicle front headlight device according to the first exemplary embodiment.

As illustrated in (A) of FIG. 4, an illuminated sub-region $Ha_1$ is formed by reflected light (visible light) that is light emitted from the light source 20 and reflected by the first mirror body 28A when allocated at a predetermined first stationary position, for example. The illuminated sub-region $Ha_1$ has a rectangular shape with its length direction in the vertical direction, and is formed at a predetermined position at a left end at the forward-left of the vehicle 12.

As illustrated in (B) of FIG. 4, an illuminated sub-region $Ha_2$ is formed by reflected light that is light emitted from the light source 20 and reflected by the first mirror body 28A when allocated at a second stationary position in a state rotated by, for example, 36° from the first stationary position. The illuminated sub-region $Ha_2$ has a rectangular shape with its length direction in the vertical direction, and is formed at a position shifted toward the right from the predetermined position at the left end at the forward-left of the vehicle 12.

As illustrated in (C) of FIG. 4, an illuminated sub-region $Ha_3$ is formed by reflected light that is light emitted from the light source 20 and reflected by the first mirror body 28A when allocated at a third stationary position in a state rotated by a further 36° from the second stationary position (72° from the first stationary position). The illuminated sub-region $Ha_3$ has a rectangular shape with its length direction in the vertical direction, and is formed at a position shifted to a central position at the forward-left of the vehicle 12.

As illustrated in (D) of FIG. 4, an illuminated sub-region $Ha_4$ is formed by reflected light that is light emitted from the light source 20 and reflected by the first mirror body 28A when allocated at a fourth stationary position in a state rotated by a further 36° from the third stationary position (108° from the first stationary position). The illuminated sub-region $Ha_4$ has a rectangular shape with its length direction in the vertical direction, and is formed at a position shifted toward the right of the central position at the forward-left of the vehicle 12.

As illustrated in (E) of FIG. 4, an illuminated sub-region $Ha_5$ is formed by reflected light that is light emitted from the light source 20 and reflected by the first mirror body 28A when allocated at a fifth stationary position in a state rotated by a further 36° from the fourth stationary position (144° from the first stationary position). The illuminated sub-region $Ha_5$ has a rectangular shape with its length direction in the vertical direction, and is formed at a predetermined position at a right end at the forward-left of the vehicle 12.

When the first mirror body 28A is rotated a further 36° from the fifth stationary position (180° from the first stationary position), light is reflected by the second mirror body 28B. Explanation now follows regarding the second illuminated region HaR formed by light reflected by the second mirror body 28B.

Figure 5:
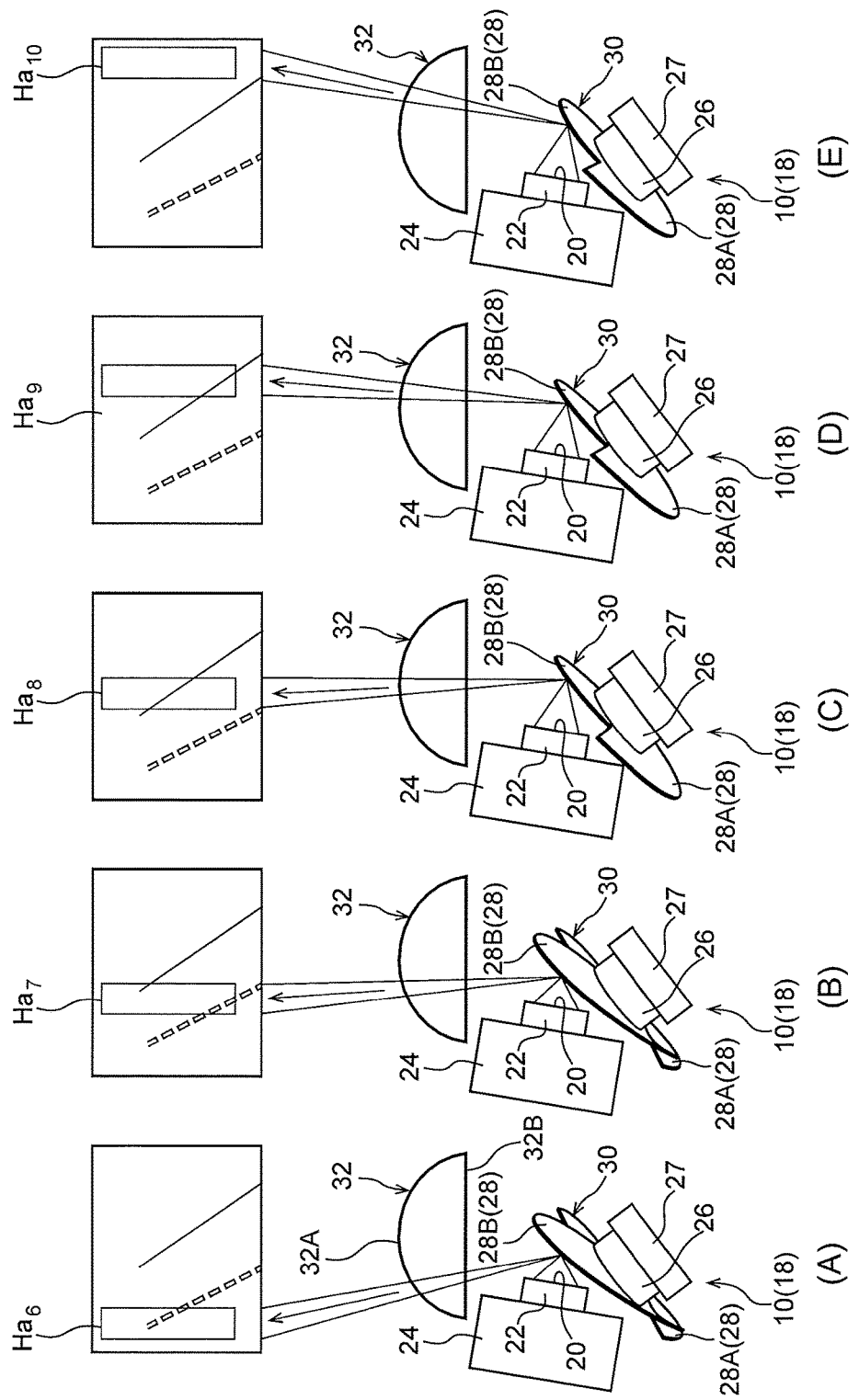
FIG. 5 is an explanatory diagram illustrating a sequence of illuminated regions at predetermined different points in time when a second mirror body undergoes half a revolution in the vehicle front headlight device according to the first exemplary embodiment.

As illustrated in (A) of FIG. 5, an illuminated sub-region $Ha_6$ is formed by reflected light (visible light) that is light emitted from the light source 20 and reflected by the second mirror body 28B when allocated at a sixth stationary position in a state rotated by a further 36° from the fifth stationary position (180° from the first stationary position). The illuminated sub-region $Ha_6$ has a rectangular shape with its length direction in the vertical direction, and is formed at a predetermined position at a left end at the forward-right of the vehicle 12.

As illustrated in (B) of FIG. 5, an illuminated sub-region $Ha_7$ is formed by reflected light that is light emitted from the light source 20 and reflected by the second mirror body 28B when allocated at a seventh stationary position in a state rotated by a further 36° from the sixth stationary position (216° from the first stationary position). The illuminated sub-region $Ha_7$ has a rectangular shape with its length direction in the vertical direction, and is formed at a position shifted toward the right of the predetermined position at the left end at the forward-right of the vehicle 12.

As illustrated in (C) of FIG. 5, an illuminated sub-region $Ha_8$ is formed by reflected light that is light emitted from the light source 20 and reflected by the second mirror body 28B when allocated at an eighth stationary position in a state rotated by a further 36° from the seventh stationary position (252° from the first stationary position). The illuminated sub-region $Ha_8$ has a rectangular shape with its length direction in the vertical direction, and is formed at a position shifted to a central position at the forward-right of the vehicle 12.

As illustrated in (D) of FIG. 5, an illuminated sub-region $Ha_9$ is formed by reflected light that is light emitted from the light source 20 and reflected by the second mirror body 28B when allocated at a ninth stationary position in a state rotated by a further 36° from the eighth stationary position (288° from the first stationary position). The illuminated sub-region $Ha_9$ has a rectangular shape with its length direction in the vertical direction, and is formed at a position shifted toward the right of the central position at the forward-right of the vehicle 12.

As illustrated in (E) of FIG. 5, an illuminated sub-region $Ha_{10}$ is formed by reflected light that is light emitted from the light source 20 and reflected by the second mirror body 28B when allocated at a tenth stationary position in a state rotated by a further 36° from the ninth stationary position (324° from the first stationary position). The illuminated sub-region $Ha_{10}$ has a rectangular shape with its length direction in the vertical direction, and is formed at a predetermined position at a right end at the forward-right of the vehicle 12.

When the second mirror body 28B is rotated a further 36° from the tenth stationary position (360° from the first stationary position), the rotating mirror 30 returns to its original state as illustrated in (A) of FIG. 4, and light is reflected by the first mirror body 28A again.

Namely, as the rotating mirror 30 makes one full revolution (in the respective half revolutions), at the forward-left of the vehicle 12 there is a shift of an illuminated sub-region along the vehicle width direction from one side to the other side (from the left to the right) through the rectangular shaped illuminated sub-regions $Ha_1$, $Ha_2$, $Ha_3$, $Ha_4$, $Ha_5$ with their length directions in the vertical direction, and at the forward-right of the vehicle 12 there is a shift of an illuminated sub-region along the vehicle width direction from one side to the other side (from the left to the right) through the rectangular shaped illuminated sub-regions $Ha_6$, $Ha_7$, $Ha_8$, $Ha_9$, $Ha_{10}$ with their length directions in the vertical direction.

Accordingly, by continuously rotating the rotating mirror 30 at a predetermined speed or greater (for example at 200 Hz), at the forward-left of the vehicle 12 there are consecutive high-speed shifts of the illuminated sub-region along the vehicle width direction from the one side to the other side (from the left to the right) through the illuminated sub-regions $Ha_1$, $Ha_2$, $Ha_3$, $Ha_4$, $Ha_5$, and at the forward-right of the vehicle 12 there are consecutive high-speed shifts of the illuminated sub-region along the vehicle width direction from the one side to the other side (from the left to the right) through the illuminated sub-regions $Ha_6$, $Ha_7$, $Ha_8$, $Ha_9$, $Ha_{10}$.

Accordingly, as illustrated in FIG. 2 and FIG. 3, due to the afterimage effect of the light, to the human eye, the substantially rectangular shaped first illuminated region HaL with its length direction in the vehicle width direction appears at the forward-left of the vehicle 12, and the substantially rectangular shaped second illuminated region HaR with its length direction in the vehicle width direction appears at the forward-right of the vehicle 12. The first illuminated region HaL and the second illuminated region HaR partially overlap with each other at a vehicle width direction inner side (at least at the illuminated sub-region $Ha_5$ and the illuminated sub-region $Ha_6$).

Namely, the high beam light distribution area Ha is enlarged in the vehicle width direction by illuminating the first illuminated region HaL on the forward-left and illuminating the second illuminated region HaR on the forward-right so as to be offset from each other in the vehicle width direction (left-right direction). Moreover, the light illumination intensity is raised at a vehicle width direction substantially central portion HaW of the high beam light distribution area Ha where the first illuminated region HaL and the second illuminated region HaR overlap with each other.

As illustrated in FIG. 1, a recognition unit 34 and a pedestrian recognition unit 36, each configured by a camera, a sensor, or the like, are provided side-by-side on the left and right at a vehicle width direction central portion of an upper end portion of a front windshield of the vehicle 12. A surrounding environment detection device 38 that detects a situation in the surroundings of the vehicle 12 is provided on the roof of the vehicle 12. The recognition unit 34, the pedestrian recognition unit 36, and the surrounding environment detection device 38 are each electrically connected to the controller 40.

Explanation follows regarding operation of the vehicle front headlight device 10 according to the first exemplary embodiment configured as described above.

When the vehicle 12 is traveling at night and so on, the high beam is switched on as required. Namely, the driver operates a switch to drive rotation of the rotating mirror 30 and switch on the light source 20, or the controller 40 drives rotation of the rotating mirror 30 and switches on the light source 20 based on information detected by the surrounding environment detection device 38 provided to the vehicle 12.

When this is performed, visible light emitted from the light source 20 is reflected by the rotation-driven rotating mirror 30 (the first mirror body 28A and the second mirror body 28B), passes through the lens 32, and is radiated ahead of the vehicle. The high precision high beam light distribution area Ha is thus formed, higher up and further ahead than the low beam light distribution area (see FIG. 3).

As illustrated in FIG. 12, if the high beam light distribution area Ha was enlarged in the left-right direction by changing the curvature of the lens 32 while keeping the same number of the light sources 20, the light illumination intensity would decrease overall. If the number of the light sources 20 used to illuminate the high beam light distribution area Ha is increased in order to suppress the decrease in light illumination intensity (to maintain the light illumination intensity), the manufacturing costs of the vehicle front headlight device would be increased.

By contrast, in the vehicle front headlight device 10 according to the first exemplary embodiment, as illustrated in FIG. 2 and FIG. 3, the high beam light distribution area Ha is formed by the first illuminated region HaL at the forward-left of the vehicle 12 that is illuminated by light reflected by the first mirror body 28A, and the second illuminated region HaR at the forward-right of the vehicle 12 that is illuminated by light reflected by the second mirror body 28B. This thereby enables the high beam light distribution area Ha to be enlarged in the vehicle width direction (left-right direction) while maintaining the light illumination intensity ahead of the vehicle 12.

Namely, the vehicle front headlight device 10 according to the first exemplary embodiment prevents a decrease in the light illumination intensity, even when the high beam light distribution area Ha is enlarged in the vehicle width direction. Moreover, this is achieved simply by providing the first mirror body 28A and the second mirror body 28B, and so there is no need to increase the number of the light sources 20 (the same number of the light sources 20 can be maintained), avoiding an increase in the manufacturing costs.

The first illuminated region HaL and the second illuminated region HaR partially overlap with each other at the vehicle width direction inner side, thereby increasing the illumination intensity of the vehicle width direction substantially central portion HaW of the high beam light distribution area Ha ahead of the vehicle 12. This thereby improves visibility ahead of the vehicle of the driver in the vehicle 12 when traveling at night and so on.

Second Exemplary Embodiment

Explanation follows regarding a vehicle front headlight device 10 according to a second exemplary embodiment. Locations equivalent to those of the first exemplary embodiment described above are allocated the same reference numerals, and detailed explanation thereof is omitted as appropriate.

Figure 6:
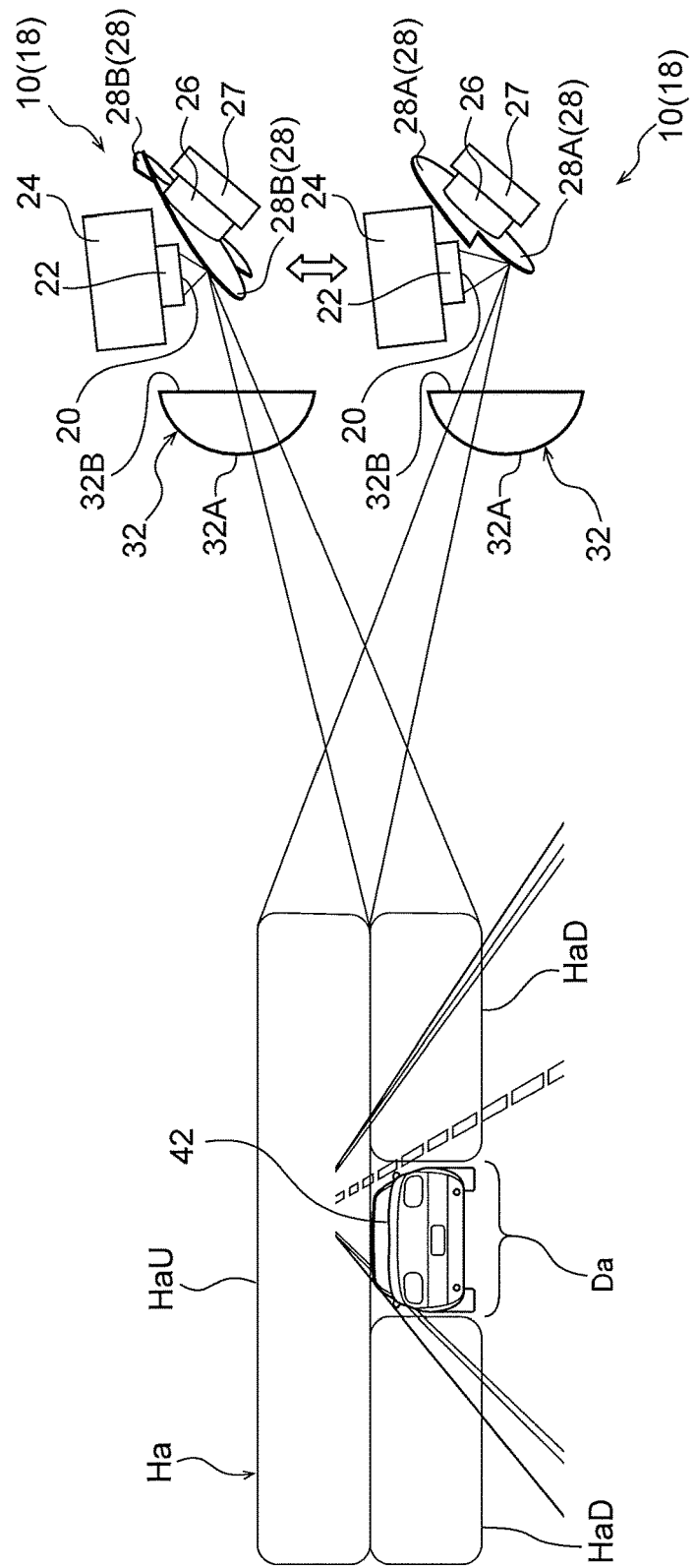
FIG. 6 is an explanatory diagram illustrating a high beam light distribution area formed by a vehicle front headlight device according to a second exemplary embodiment.

As illustrated in FIG. 6, in the vehicle front headlight device 10 according to the second exemplary embodiment, the high beam light distribution area Ha is enlarged in the vehicle vertical direction. Namely, in the second exemplary embodiment, the rotating mirror 30 is configured including a first mirror body 28A with a curvature that reflects light upward, and a second mirror body 28B with a curvature that reflects light downward.

Accordingly, in the second exemplary embodiment, the high beam light distribution area Ha is formed by a first illuminated region HaU of light reflected by the first mirror body 28A and radiated toward an upper side ahead of the vehicle 12, and a second illuminated region HaD of light reflected by the second mirror body 28B and radiated toward a lower side ahead of the vehicle 12. Note that FIG. 6 illustrates two of the high beam units 18. However, each of the high beam units 18 corresponds to a single high beam unit 18 of the headlamp unit 14L on the left of the front end section of the vehicle 12 in FIG. 1. Namely, in order to help explain the first illuminated region HaU and the second illuminated region HaD that are radiated by the single high beam unit 18, the high beam unit 18 of the headlamp unit 14L on the left of the front end section of the vehicle 12 is illustrated conceptually.

In cases in which a leading vehicle 42 is traveling ahead of the vehicle 12, the second illuminated region HaD formed by reflection by the second mirror body 28B is set with a dark area Da that is a shaded region not illuminated by the high beam (light), so as not to dazzle the driver and so on of the leading vehicle 42. Explanation follows regarding a method used to form the dark area Da.

Figure 7:
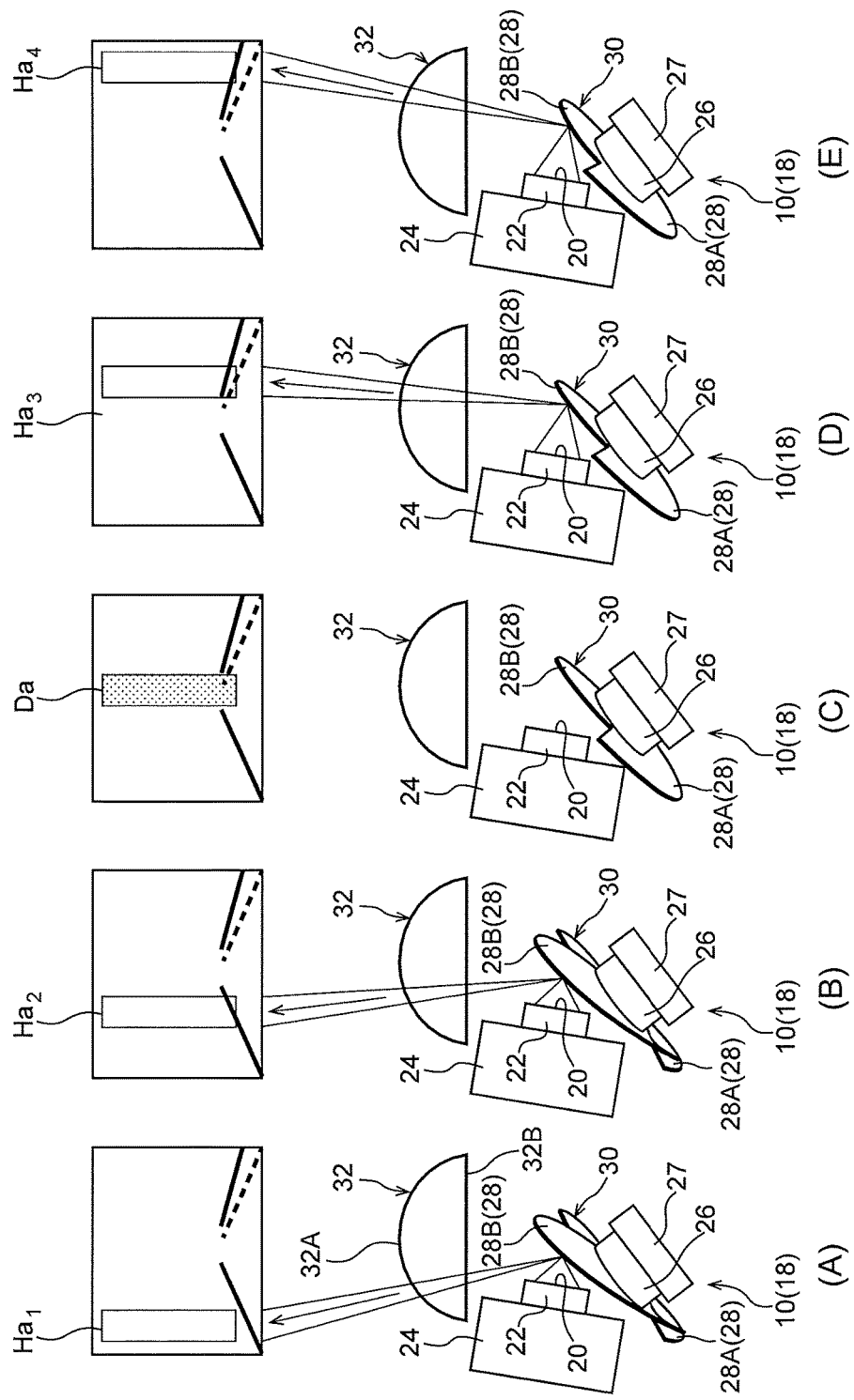
FIG. 7 is an explanatory diagram illustrating a sequence of illuminated regions at predetermined different points in time when a second mirror body undergoes half a revolution in the vehicle front headlight device according to the second exemplary embodiment.

As illustrated in (A) of FIG. 7, an illuminated sub-region $Ha_1$ is formed by reflected light (visible light) that is light emitted from the light source 20 and reflected by the second mirror body 28B when allocated at a predetermined first stationary position, for example. The illuminated sub-region $Ha_1$ has a rectangular shape with its length direction in the vertical direction, and is formed at a predetermined position at a left end ahead of the vehicle 12.

As illustrated in (B) of FIG. 7, an illuminated sub-region $Ha_2$ is formed by reflected light that is light emitted from the light source 20 and reflected by the second mirror body 28B when allocated at a second stationary position in a state rotated by, for example, 36° from the first stationary position. The illuminated sub-region $Ha_2$ has a rectangular shape with its length direction in the vertical direction, and is formed at a position shifted toward the right of the predetermined position at the left end ahead of the vehicle 12.

As illustrated in (C) of FIG. 7, the light source 20 is switched off and light is not radiated when the second mirror body 28B is allocated at a third stationary position in a state rotated by a further 36° from the second stationary position (72° from the first stationary position). The dark area Da in which light is not radiated is thereby formed in the second illuminated region HaD.

As illustrated in (D) of FIG. 7, an illuminated sub-region $Ha_3$ is formed by reflected light that is light emitted from the light source 20 and reflected by the second mirror body 28B when allocated at a fourth stationary position in a state rotated by a further 36° from the third stationary position (108° from the first stationary position). The illuminated sub-region $Ha_3$ has a rectangular shape with its length direction in the vertical direction, and is formed at a position shifted toward the right of the central position ahead of the vehicle 12.

As illustrated in (E) of FIG. 7, an illuminated sub-region $Ha_4$ is formed by reflected light that is light emitted from the light source 20 and reflected by the second mirror body 28B when allocated at a fifth stationary position in a state rotated by a further 36° from the fourth stationary position (144° from the first stationary position). The illuminated sub-region $Ha_4$ has a rectangular shape with its length direction in the vertical direction, and is formed at a predetermined position at a right end ahead of the vehicle 12.

When the second mirror body 28B is rotated a further 36° from the fifth stationary position (180° from the first stationary position), light is reflected by the first mirror body 28A. The first illuminated region HaU formed by reflection by the first mirror body 28A is similar to the first illuminated region HaL and the second illuminated region HaR of the first exemplary embodiment described above, and so explanation thereof is omitted.

When the rotating mirror 30 is continuously rotated at a predetermined speed or greater (for example at 200 Hz), as illustrated in FIG. 6, due to the afterimage effect of the light, to the human eye, the substantially rectangular shaped second illuminated region HaD with its length direction in the vehicle width direction, and not lit up at the vehicle width direction substantially central portion only (formed with the dark area Da at the vehicle width direction substantially central portion only), appears at the lower side ahead of the vehicle 12, and the substantially rectangular shaped first illuminated region HaU with its length direction in the vehicle width direction appears at the upper side ahead of the vehicle 12.

Note that although not illustrated in the drawings, the first illuminated region HaU and the second illuminated region HaD may partially overlap with each other in the vehicle vertical direction. Namely, a lower end portion of the first illuminated region HaU and an upper end portion of the second illuminated region HaD may overlap with each other.

The recognition unit 34 recognizes that a leading vehicle 42 is traveling ahead of the vehicle 12. The controller 40 adjusts a timing to switch off the light source 20 and a timing to switch on the light source 20 according to the distance to the leading vehicle 42 (the position of the leading vehicle 42 relative to the vehicle 12) recognized by the recognition unit 34.

Explanation follows regarding operation of the vehicle front headlight device 10 according to the second exemplary embodiment configured as described above (explanation of common operation is omitted as appropriate).

When the vehicle 12 is traveling at night and so on, the high beam is switched on as required. Namely, the driver operates a switch to drive rotation of the rotating mirror 30 and switch on the light source 20, or the controller 40 drives rotation of the rotating mirror 30 and switches on the light source 20 based on information detected by the surrounding environment detection device 38 provided to the vehicle 12.

When this is performed, visible light emitted from the light source 20 is reflected by the rotation-driven rotating mirror 30 (the first mirror body 28A and the second mirror body 28B), passes through the lens 32, and is radiated ahead of the vehicle. The high precision high beam light distribution area Ha is thus formed, higher up and further ahead than the low beam light distribution area (see FIG. 6).

In the vehicle front headlight device 10 according to the second exemplary embodiment, as illustrated in FIG. 6, the high beam light distribution area Ha is formed by the first illuminated region HaU at the upper side ahead of the vehicle 12 illuminated by light reflected by the first mirror body 28A, and the second illuminated region HaD at the lower side ahead of the vehicle 12 illuminated by light reflected by the second mirror body 28B. This thereby enables the high beam light distribution area Ha to be enlarged in the vehicle vertical direction while maintaining the light illumination intensity ahead of the vehicle 12.

Namely, the vehicle front headlight device 10 according to the second exemplary embodiment prevents a decrease in the light illumination intensity, even when the high beam light distribution area Ha is enlarged in the vehicle vertical direction. Moreover, this is achieved simply by providing the first mirror body 28A and the second mirror body 28B, so that there is no need to increase the number of the light sources 20 (the same number of the light sources 20 can be maintained), avoiding an increase in the manufacturing costs.

In cases in which the recognition unit 34 has recognized that a leading vehicle 42 is traveling ahead of the vehicle 12, the dark area Da is formed in the second illuminated region HaD configuring the high beam light distribution area Ha, such that the high beam is not radiated at the leading vehicle 42. Specifically, a timing to switch off the light source 20 and a timing to switch on the light source 20 are controlled by the controller 40 such that the light source 20 is temporarily switched off in the vicinity of the third stationary position of the second mirror body 28B.

This thereby enables the driver and so on of the leading vehicle 42 to be suppressed from being dazzled, even when the high beam is switched on when the vehicle 12 is traveling at night and so on. Since the high beam is radiated toward the vehicle width direction outer sides of the leading vehicle 42, visibility ahead of the vehicle by the driver in the vehicle 12 is not decreased.

Third Exemplary Embodiment

Explanation follows regarding a vehicle front headlight device 10 according to a third exemplary embodiment. Locations equivalent to those of the first exemplary embodiment and the second exemplary embodiment described above are allocated the same reference numerals, and detailed explanation thereof is omitted as appropriate.

Figure 8:
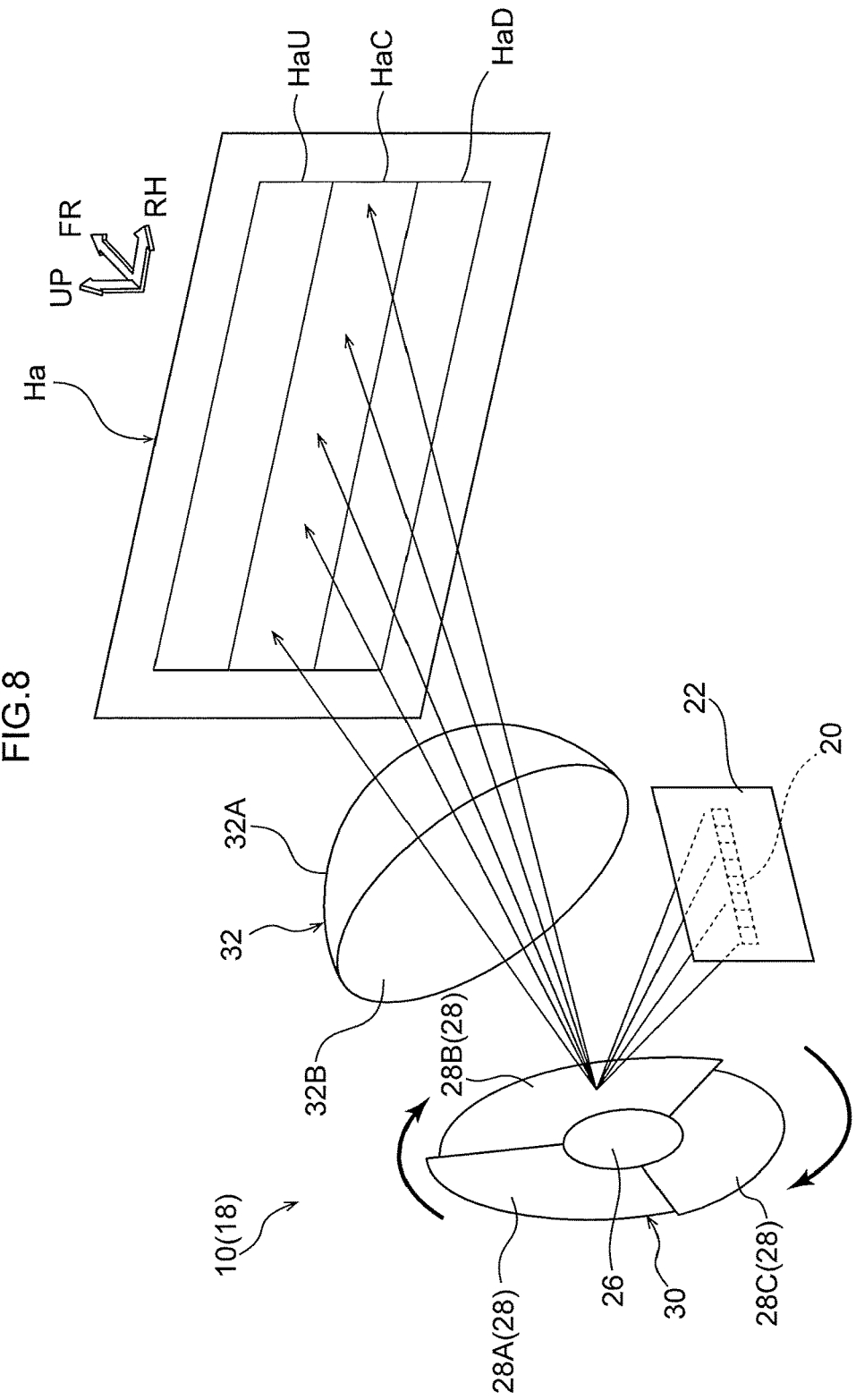
FIG. 8 is a schematic perspective view illustrating a vehicle front headlight device according to a third exemplary embodiment.
Figure 9:
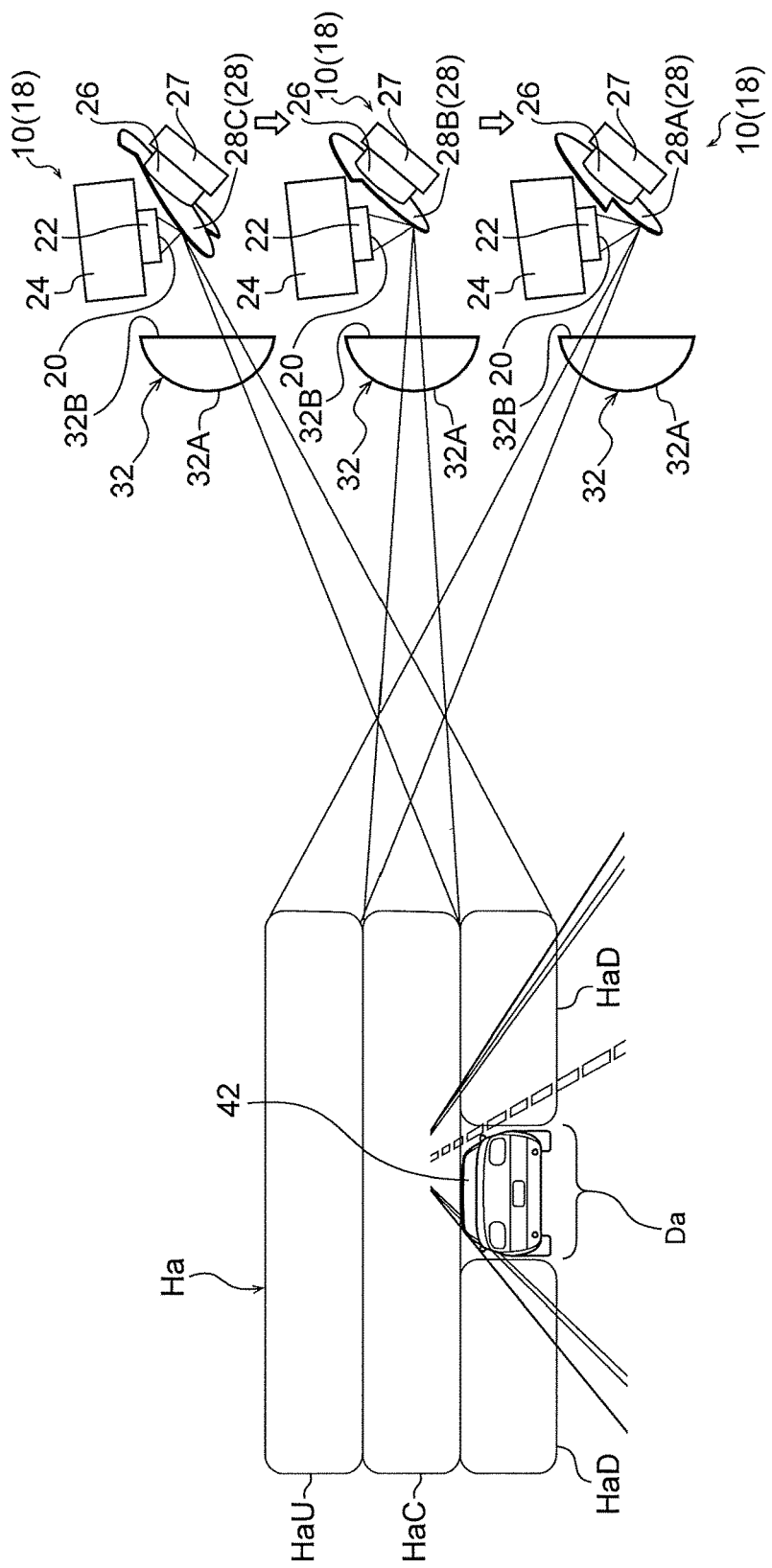
FIG. 9 is an explanatory diagram illustrating a high beam light distribution area formed by a vehicle front headlight device according to the third exemplary embodiment.

As illustrated in FIG. 8 and FIG. 9, in the vehicle front headlight device 10 according to the third exemplary embodiment, the high beam light distribution area Ha is enlarged in the vehicle vertical direction. Namely, in the third exemplary embodiment, the rotating mirror 30 is configured including a first mirror body 28A with a curvature that reflects light upward, a third mirror body 28C with a curvature that reflects light downward, and a second mirror body 28B with a curvature that reflects light substantially toward the vehicle vertical direction central region.

Accordingly, in the third exemplary embodiment, the high beam light distribution area Ha is formed by a first illuminated region HaU of light reflected by the first mirror body 28A and radiated toward an upper side ahead of the vehicle 12, a third illuminated region HaD of light reflected by the third mirror body 28C and radiated toward a lower side ahead of the vehicle 12, and a second illuminated region HaC of light reflected by the second mirror body 28B and radiated toward a forward-center of the vehicle 12 (between the first illuminated region HaU and the third illuminated region HaD). Note that FIG. 9 illustrates three of the high beam units 18. However, each of the high beam units 18 corresponds to a single high beam unit 18 of the headlamp unit 14L on the left of the front end section of the vehicle 12 in FIG. 1. Namely, in order to help to explain the first illuminated region HaU, the third illuminated region HaD, and the second illuminated region HaC that are radiated by the single high beam unit 18, the high beam unit 18 of the headlamp unit 14L on the left of the front end section of the vehicle 12 is illustrated conceptually.

The first mirror body 28A, the second mirror body 28B, and the third mirror body 28C each have a substantially spreading fan shaped profile with a central angle of 120° as viewed along their respective axial directions (see FIG. 8). As illustrated in FIG. 9, in cases in which a leading vehicle 42 is traveling ahead of the vehicle 12, the third illuminated region HaD formed by reflection by the third mirror body 28C is set with a dark area Da that is a shaded region not illuminated by the high beam, so as not to dazzle the driver and so on of the leading vehicle 42.

The method used to form the dark area Da is similar to that of the second exemplary embodiment illustrated in FIG. 7. Namely, the controller 40 controls a timing to switch off and a timing to switch on the light source 20 when emitting light toward the third mirror body 28C, similarly to in the second exemplary embodiment described above. Note that as illustrated in FIG. 10, in cases in which the leading vehicle 42 is at a position comparatively close to the vehicle 12, a dark area Da that is a shaded region not illuminated by the high beam is set in the second illuminated region HaC in addition to in the third illuminated region HaD.

Namely, the controller 40 also controls the timing to switch off and the timing to switch on the light source 20 when emitting light toward the second mirror body 28B, similarly to in the second exemplary embodiment described above. Accordingly, out of the second mirror body 28B and the third mirror body 28C in the third exemplary embodiment, the dark area Da that is a shaded region not illuminated by the high beam is set at least in the third illuminated region HaD formed by reflection by the third mirror body 28C.

Figure 10:
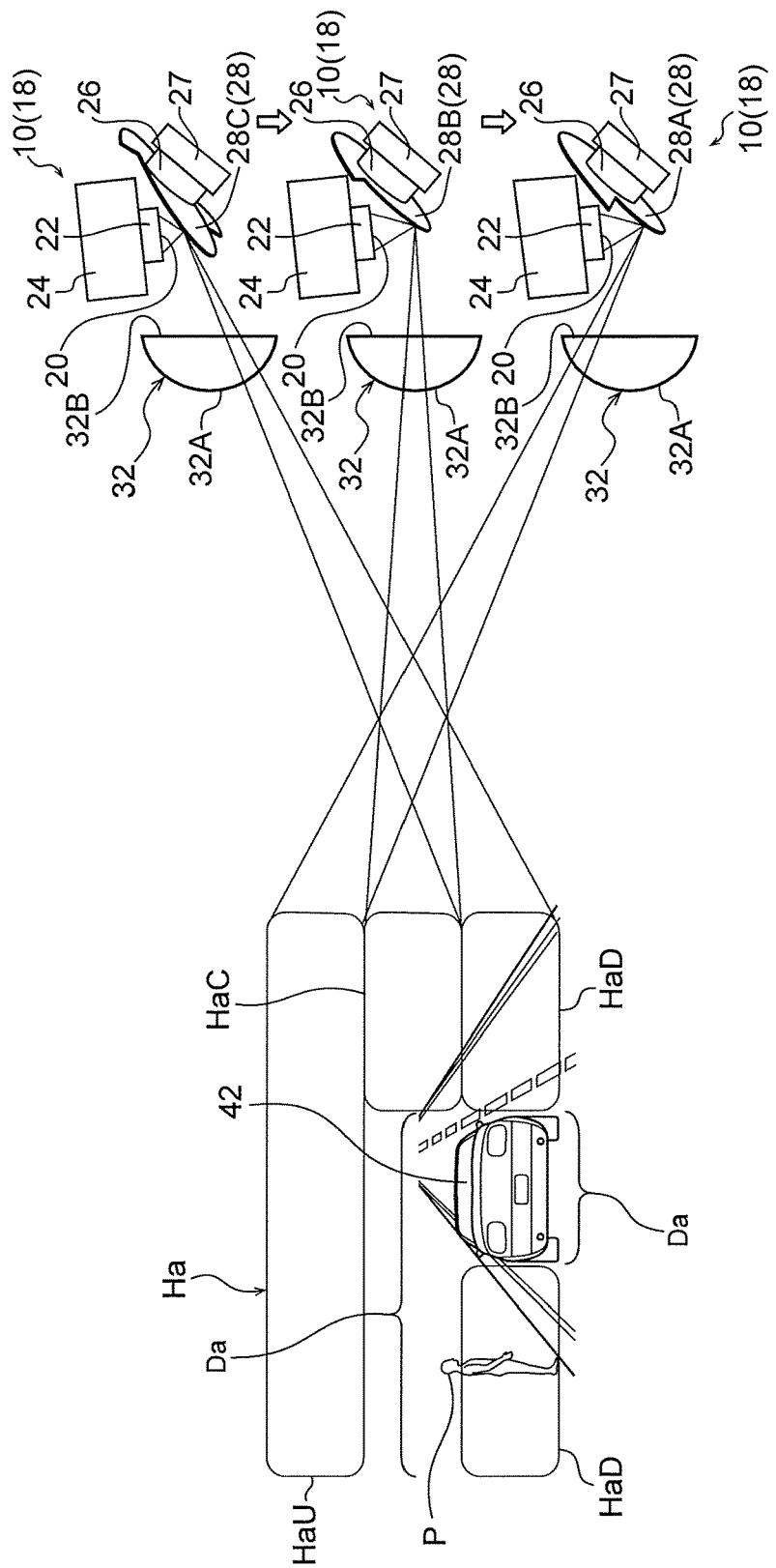
FIG. 10 is an explanatory diagram illustrating another high beam light distribution area formed by the vehicle front headlight device according to the third exemplary embodiment.

Moreover, in the third exemplary embodiment, as illustrated in FIG. 10, in cases in which a pedestrian P is present at the roadside in the vicinity of the leading vehicle 42, the controller 40 controls a timing to switch off and a timing to switch on the light source 20 when emitting light toward the second mirror body 28B such that light is not radiated onto at least the face of the pedestrian P.

Namely, the timing to switch off and the timing to switch on the light source 20 toward the second mirror body 28B are controlled such that the illuminated sub-region $Ha_1$ and the illuminated sub-region $Ha_2$ illustrated in FIG. 7 also become dark areas Da. Note that although not illustrated in the drawings, the timing to switch off and the timing to switch on the light source 20 when emitting light toward the first mirror body 28A may also be controlled according to the position of the pedestrian P. Moreover, the position of the pedestrian P may be recognized by the pedestrian recognition unit 36.

Explanation follows regarding operation of the vehicle front headlight device 10 according to the third exemplary embodiment configured as described above (explanation of common operation is omitted as appropriate).

When the vehicle 12 is traveling at night and so on, the high beam is switched on as required. Namely, the driver operates a switch to drive rotation of the rotating mirror 30 and switch on the light source 20, or the controller 40 drives rotation of the rotating mirror 30 and switches on the light source 20 based on information detected by the surrounding environment detection device 38 provided to the vehicle 12.

When this is performed, visible light emitted from the light source 20 is reflected by the rotation-driven rotating mirror 30 (the first mirror body 28A, the second mirror body 28B, and the third mirror body 28C), passes through the lens 32, and is radiated ahead of the vehicle. The high precision high beam light distribution area Ha is thus formed, higher up and further ahead than the low beam light distribution area.

In the vehicle front headlight device 10 according to the third exemplary embodiment, as illustrated in FIG. 8 and FIG. 9, the high beam light distribution area Ha is formed by the first illuminated region HaU at the upper side ahead of the vehicle 12 illuminated by light reflected by the first mirror body 28A, the third illuminated region HaD at the lower side ahead of the vehicle 12 illuminated by light reflected by the third mirror body 28C, and the second illuminated region HaC at the forward-center of the vehicle 12 (between the first illuminated region HaU and the third illuminated region HaD) illuminated by light reflected by the second mirror body 28B.

This thereby enables the high beam light distribution area Ha to be enlarged in the vehicle vertical direction while maintaining the light illumination intensity ahead of the vehicle 12. Namely, the vehicle front headlight device 10 according to the third exemplary embodiment prevents a decrease in the light illumination intensity, even when the high beam light distribution area Ha is enlarged in the vehicle vertical direction. Moreover, this is achieved simply by providing the first mirror body 28A, the second mirror body 28B, and the third mirror body 28C, so that there is no need to increase the number of the light sources 20 (the same number of the light sources 20 can be maintained), avoiding an increase in the manufacturing costs.

In cases in which the recognition unit 34 has recognized that a leading vehicle 42 is present, and the leading vehicle 42 is at a position comparatively distant from the vehicle 12, as illustrated in FIG. 9, the dark area Da is formed only in the third illuminated region HaD by reflection by the third mirror body 28C. In cases in which the leading vehicle 42 is at a position comparatively close to the vehicle 12, as illustrated in FIG. 10, the dark area Da is formed in both the third illuminated region HaD by reflection by the third mirror body 28C and the second illuminated region HaC by reflection by the second mirror body 28B.

This thereby enables the driver and so on of the leading vehicle 42 to be suppressed from being dazzled, even when the high beam is switched on when the vehicle 12 is traveling at night and so on. Since the high beam is radiated at the vehicle width direction outer sides of the leading vehicle 42, visibility ahead of the vehicle by the driver in the vehicle 12 is not reduced.

Moreover, in cases in which the pedestrian recognition unit 36 recognizes that a pedestrian P is present at the roadside close to the leading vehicle 42, a further dark area Da is formed in a left portion of the second illuminated region HaC where the roadside is illuminated by reflection by the second mirror body 28B. This thereby enables the pedestrian P present at the roadside to be suppressed or prevented from being dazzled. Note that a further dark area Da may be formed in a left portion of the first illuminated region HaU where the roadside is illuminated by reflection by the first mirror body 28A, depending on the position of the pedestrian P at the roadside.

Fourth Exemplary Embodiment

Finally, explanation follows regarding a fourth exemplary embodiment. Locations equivalent to those of the first exemplary embodiment to the third exemplary embodiment described above are allocated the same reference numerals, and detailed explanation thereof (including that of common operation) is omitted as appropriate.

As illustrated in FIG. 11, in a vehicle front headlight device 10 according to the fourth exemplary embodiment, the high beam light distribution area Ha is enlarged in the vehicle vertical direction similarly to in the second exemplary embodiment. In the vehicle front headlight device 10 according to the fourth exemplary embodiment, two independent rotating mirrors 30, each including a mirror body 28 with a substantially circular shape as viewed along its axial direction, are respectively provided at the headlamp unit 14R on the right of the front end section of the vehicle 12 and at the headlamp unit 14L on the left of the front end section of the vehicle 12.

Namely, in the vehicle front headlight device 10 according to the fourth exemplary embodiment, a first rotating mirror 30A and a second rotating mirror 30B that are driven so as to rotate in one direction (the same direction) independently of each other are provided. The first mirror body 28A provided on a first shaft 26A of the first rotating mirror 30A has a curvature that reflects light upward, and the second mirror body 28B provided on a second shaft 26B of the second rotating mirror 30B has a curvature that reflects light downward.

Accordingly, in the fourth exemplary embodiment, the high beam light distribution area Ha is formed by a first illuminated region HaU of light reflected by the first rotating mirror 30A (first mirror body 28A) and radiated toward an upper side ahead of the vehicle 12, and a second illuminated region HaD of light reflected by the second rotating mirror 30B (second mirror body 28B) and radiated toward a lower side ahead of the vehicle 12. Note that in the fourth exemplary embodiment, two of the light sources 20 are also provided independently of each other corresponding to the first rotating mirror 30A and the second rotating mirror 30B so as to configure a first light source 20A and a second light source 20B. Note that FIG. 11 illustrates the first rotating mirror 30A and the second rotating mirror 30B spaced apart from each other. However, this is to help to explain the first illuminated region HaU and the second illuminated region HaD, and the positions of the first rotating mirror 30A and the second rotating mirror 30B are merely examples.

In the fourth exemplary embodiment, in cases in which the recognition unit 34 has recognized that a leading vehicle 42 is present, the dark area Da is formed in the second illuminated region HaD, similarly to in the second exemplary embodiment. This thereby enables the driver and so on of the leading vehicle 42 to be suppressed from being dazzled, even when the high beam is switched on when the vehicle 12 is traveling at night and so on.

In the fourth exemplary embodiment, the independently rotation-driven first rotating mirror 30A and second rotating mirror 30B may be employed to enlarge the high beam light distribution area Ha in the vehicle width direction, similarly to in the first exemplary embodiment described above. Namely, the high beam light distribution area Ha may be formed by a first illuminated region HaL illuminated by light reflected by the first rotating mirror 30A, and a second illuminated region HaR illuminated by light reflected by the second rotating mirror 30B.

Moreover, in the fourth exemplary embodiment, the high beam light distribution area Ha may be enlarged in the vehicle vertical direction similarly to in the third exemplary embodiment described above by adding one more rotating mirror 30, namely a third rotating mirror (not illustrated in the drawings). Namely, the high beam light distribution area Ha may be formed by a first illuminated region HaU illuminated by light reflected by the first rotating mirror 30A, a second illuminated region HaC illuminated by light reflected by the second rotating mirror 30B, and a third illuminated region HaD illuminated by light reflected by the third rotating mirror.

A vehicle front headlight device 10 according to respective exemplary embodiments has been described above with reference to the drawings. However, the vehicle front headlight device 10 according to the respective exemplary embodiments is not limited to that illustrated in the drawings, and its design may be modified as appropriate within a range not departing from the scope of the present disclosure. For example, in the fourth exemplary embodiment, the first rotating mirror 30A and the second rotating mirror 30B may rotate in opposite directions to each other.

Moreover, in the examples given in FIG. 4, FIG. 5, and FIG. 7, five shifts are made between the illuminated sub-regions, and so the rotating mirror 30 is rotated through an angle of 36° each time. However, there is no particular limitation thereto. Moreover, the number of illuminated regions used to enlarge the high beam light distribution area Ha in the vehicle vertical direction is two in the second exemplary embodiment and three in the third exemplary embodiment. However, there is no limitation thereto, and the number of illuminated regions may be set to four or more, corresponding to the number of the mirror bodies 28.

In cases in which the number of illuminated regions used to enlarge the beam light distribution area Ha in the vehicle vertical direction is four or greater, the present disclosure may be understood in the following way. Namely, that the present disclosure may be understood as "a vehicle front headlight device including a light source, a rotating mirror, a lens, and a controller, in which: the light source is configured to emit light; the rotating mirror is configured by disposing plural mirror bodies around a circumferential direction of a shaft so as to be capable of being rotationally driven about the shaft, and rotates while reflecting light emitted by the light source; the lens transmits light reflected by the rotating mirror so as to radiate the light forward; the controller controls rotational drive of the rotating mirror; and plural illuminated regions of light reflected by the respective plural mirror bodies and radiated forward through the lens are offset from each other in a vehicle vertical direction."

The vehicle front headlight device 10 according to the respective exemplary embodiments is not limited to configurations applied to the high beam unit 18. The vehicle front headlight device 10 according to the present disclosure may, for example, be provided at a headlamp unit 14 separate to a high beam unit 18 and a low beam unit 16.

What is claimed is:

1. A vehicle front headlight device comprising:
    a light source configured to emit light;
    a rotating mirror configured by disposing a first mirror body and a second mirror body around a circumferential direction of a shaft, rotationally driven about the shaft, and rotating while reflecting light emitted by the light source;
    a lens transmitting light reflected by the rotating mirror so as to illuminate the light forward; and
    a controller controlling rotational drive of the rotating mirror,
    wherein a first illuminated region of light that is reflected by the first mirror body and that is radiated forward through the lens, and a second illuminated region of light that is reflected by the second mirror body and that is radiated forward through the lens, are offset from each other in a vehicle width direction or in a vehicle vertical direction.

2. The vehicle front headlight device of claim 1, wherein the first illuminated region and the second illuminated region partially overlap with each other.

3. The vehicle front headlight device of claim 2, wherein the first illuminated region and the second illuminated region are offset from each other in the vehicle width direction, and a portion where the first illuminated region and the second illuminated region overlap is a substantially central portion in the vehicle width direction.

4. The vehicle front headlight device of claim 1, further comprising a recognition unit configured to recognize a leading vehicle traveling ahead, wherein:
    the first illuminated region and the second illuminated region are configured in this sequence from a vehicle upper side; and
    the controller controls a timing to switch off and a timing to switch on light for the second mirror body such that light is not radiated onto the leading vehicle recognized by the recognition unit.

5. A vehicle front headlight device comprising:
    a first light source and a second light source configured to emit light;
    a first rotating mirror rotationally driven about a first shaft, and rotating while reflecting light emitted by the first light source;
    a second rotating mirror rotationally driven about a second shaft, and rotating while reflecting light emitted by the second light source;
    a lens transmitting the light reflected by the first rotating mirror and the second rotating mirror and illuminating the light forward; and
    a controller controlling rotational drive of the first rotating mirror and the second rotating mirror,
    wherein a first illuminated region of light that is reflected by the first rotating mirror and that is radiated forward through the lens, and a second illuminated region of light that is reflected by the second rotating mirror and that is radiated forward through the lens, are offset from each other in a vehicle width direction or in a vehicle vertical direction.

6. The vehicle front headlight device of claim 5, wherein the first illuminated region and the second illuminated region partially overlap with each other.

7. The vehicle front headlight device of claim 6, wherein the first illuminated region and the second illuminated region are offset from each other in the vehicle width direction, and a portion where the first illuminated region and the second illuminated region overlap is a substantially central portion in the vehicle width direction.

8. The vehicle front headlight device of claim 5, further comprising a recognition unit configured to recognize a leading vehicle traveling ahead, wherein:
    the first illuminated region and the second illuminated region are configured in this sequence from a vehicle upper side; and
    the controller controls a timing to switch off and a timing to switch on light that is emitted toward the second rotating mirror such that light is not radiated onto the leading vehicle recognized by the recognition unit.

9. A vehicle front headlight device comprising:
    a light source configured to emit light;
    a rotating mirror configured by disposing a first mirror body, a second mirror body, and a third mirror body around a circumferential direction of a shaft, rotationally driven about the shaft, and rotating while reflecting light emitted by the light source;
    a lens transmitting light reflected by the rotating mirror and illuminating the light forward; and
    a controller controlling rotational drive of the rotating mirror,
    wherein a first illuminated region of light that is reflected by the first mirror body and that is radiated forward through the lens, a second illuminated region of light that is reflected by the second mirror body and that is radiated forward through the lens, and a third illuminated region of light that is reflected by the third mirror body and that is radiated forward through the lens, are offset from each other in a vehicle vertical direction.

10. The vehicle front headlight device of claim 9, further comprising a recognition unit configured to recognize a leading vehicle traveling ahead, wherein:
    the first illuminated region, the second illuminated region, and the third illuminated region are configured in this sequence from a vehicle upper side; and
    the controller controls a timing to switch off and a timing to switch on light that is emitted toward at least the third mirror body such that light is not radiated onto the leading vehicle recognized by the recognition unit.

11. The vehicle front headlight device of claim 10, further comprising a pedestrian recognition unit configured to recognize that a pedestrian is present at a roadside, wherein:

the first illuminated region, the second illuminated region, and the third illuminated region are configured in this sequence from a vehicle upper side; and the controller controls a timing to switch off and a timing to switch on light that is emitted toward the first mirror body or the second mirror body such that light is not radiated onto at least a face of the pedestrian recognized by the pedestrian recognition unit.

12. The vehicle front headlight device of claim 9, further comprising a pedestrian recognition unit configured to recognize that a pedestrian is present at a roadside, wherein:

the first illuminated region, the second illuminated region, and the third illuminated region are configured in this sequence from a vehicle upper side; and the controller controls a timing to switch off and a timing to switch on light that is emitted toward the first mirror body or the second mirror body such that light is not radiated onto at least a face of the pedestrian recognized by the pedestrian recognition unit.

* * * * *